(12) United States Patent
McKinstry

(10) Patent No.: US 9,971,032 B1
(45) Date of Patent: May 15, 2018

(54) ACOUSTIC SENSOR HOLDER AND APPARATUS USING SAME

(75) Inventor: Richard B. McKinstry, Northboro, MA (US)

(73) Assignee: ADAPTIVE WIRELESS SOLUTIONS, L.L.C., Jefferson, LA (US)

(*) Notice: Subject to any disclaimer, the term of this patent is extended or adjusted under 35 U.S.C. 154(b) by 1725 days.

(21) Appl. No.: 13/274,858

(22) Filed: Oct. 17, 2011

Related U.S. Application Data

(60) Provisional application No. 61/393,682, filed on Oct. 15, 2010.

(51) Int. Cl.
*G01S 15/00* (2006.01)

(52) U.S. Cl.
CPC .................................. *G01S 15/00* (2013.01)

(58) Field of Classification Search
USPC ......................................................... 367/188
See application file for complete search history.

(56) References Cited

U.S. PATENT DOCUMENTS

| | | | | |
|---|---|---|---|---|
| 3,479,072 A * | 11/1969 | Kosar | ................ | F16B 13/0858 403/276 |
| 4,508,241 A * | 4/1985 | Bauer | .................... | B22D 41/34 222/561 |
| 5,379,658 A | 1/1995 | Lichtenfels, II et al. | | |
| 5,798,488 A | 8/1998 | Beresford et al. | | |
| 6,027,279 A * | 2/2000 | Skjaeveland | ............ | B25G 3/00 403/370 |
| 6,404,961 B1 | 6/2002 | Bonja et al. | | |
| 6,442,304 B1 | 8/2002 | Crawley et al. | | |
| 6,496,264 B1 | 12/2002 | Goldner et al. | | |
| 6,536,553 B1 | 3/2003 | Scanlon | | |
| 7,369,716 B2 | 5/2008 | Berg et al. | | |
| 7,412,877 B1 * | 8/2008 | Bi | .......................... | G01N 11/14 73/54.23 |
| 7,696,672 B2 | 4/2010 | Sugiura et al. | | |
| 2003/0067958 A1 * | 4/2003 | Jang | ...................... | G01J 5/0022 374/131 |
| 2003/0175027 A1 * | 9/2003 | Komatsu | ........................ | 396/428 |
| 2004/0202401 A1 * | 10/2004 | Berg et al. | ........................ | 385/12 |
| 2006/0084917 A1 * | 4/2006 | Chen | ...................... | A61M 5/322 604/110 |
| 2007/0095194 A1 * | 5/2007 | Moerth | ..................... | G10C 9/00 84/452 R |
| 2007/0095324 A1 * | 5/2007 | Takahashi et al. | ........ | 123/198 E |
| 2008/0031699 A1 * | 2/2008 | Chen | ..................... | B23B 31/006 409/232 |
| 2008/0084321 A1 * | 4/2008 | Hatch et al. | ................... | 340/603 |
| 2008/0224567 A1 * | 9/2008 | Sugiura et al. | ............... | 310/322 |
| 2009/0303838 A1 | 12/2009 | Svet | | |
| 2009/0309453 A1 | 12/2009 | Andle | | |
| 2010/0091613 A1 | 4/2010 | Witte et al. | | |

\* cited by examiner

*Primary Examiner* — James R Hulka
(74) *Attorney, Agent, or Firm* — Garvey, Smith & Nehrbass, Patent Attorneys, L.L.C.; Seth M. Nehrbass; Julie Rabalais Chauvin

(57) ABSTRACT

An acoustic apparatus includes a threaded stud having an end and a hole in the end, an acorn nut having a hole therein, and an acoustic sensor received in the hole of the stud and secured to the stud and acorn nut when the acorn nut is screwed onto the stud, thereby sandwiching the acoustic sensor between the stud and the acorn nut. This apparatus can be included in an acoustic sensor assembly, such as an acoustic monitor field unit or a remote acoustic sensor assembly.

16 Claims, 4 Drawing Sheets

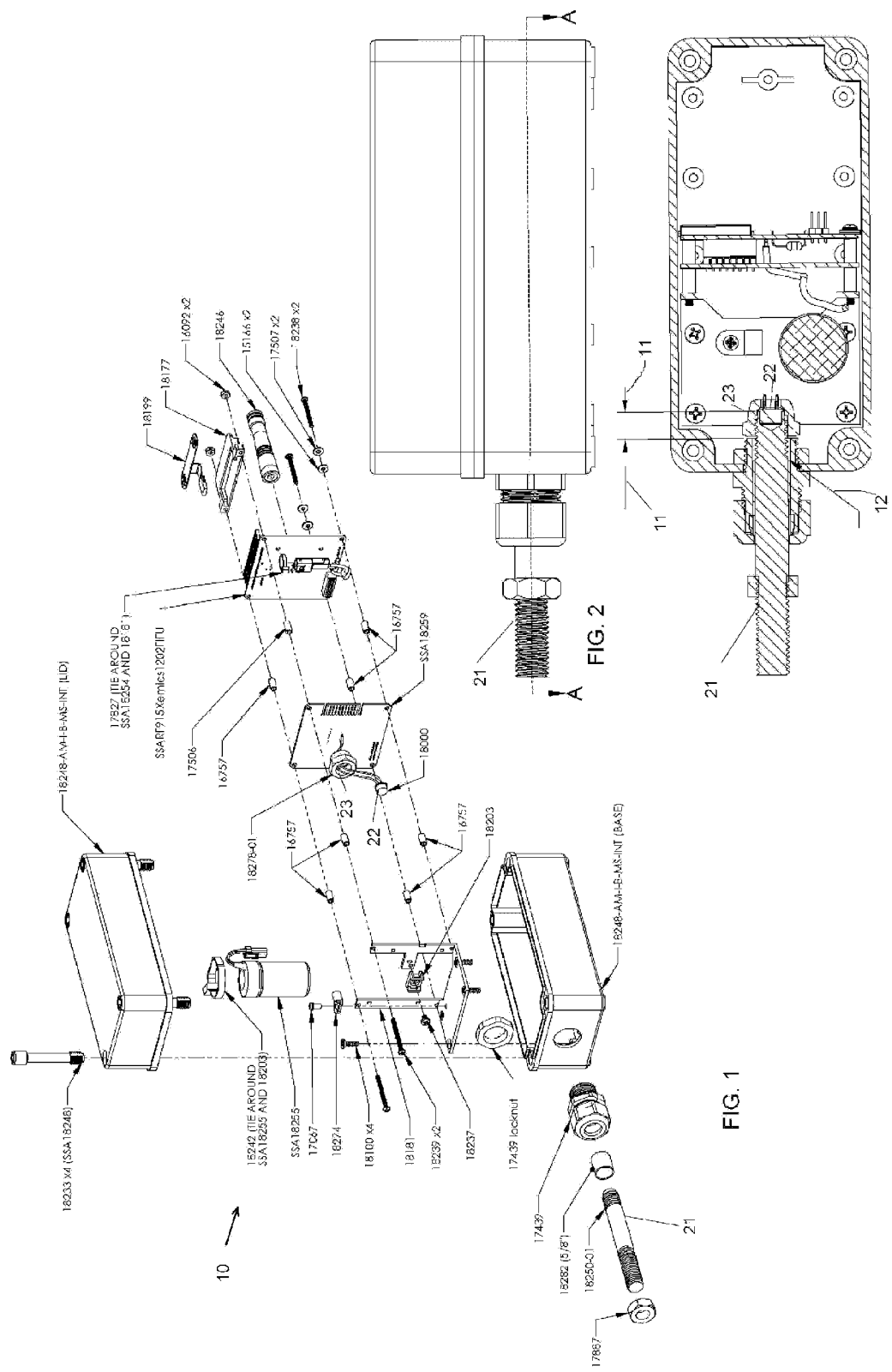

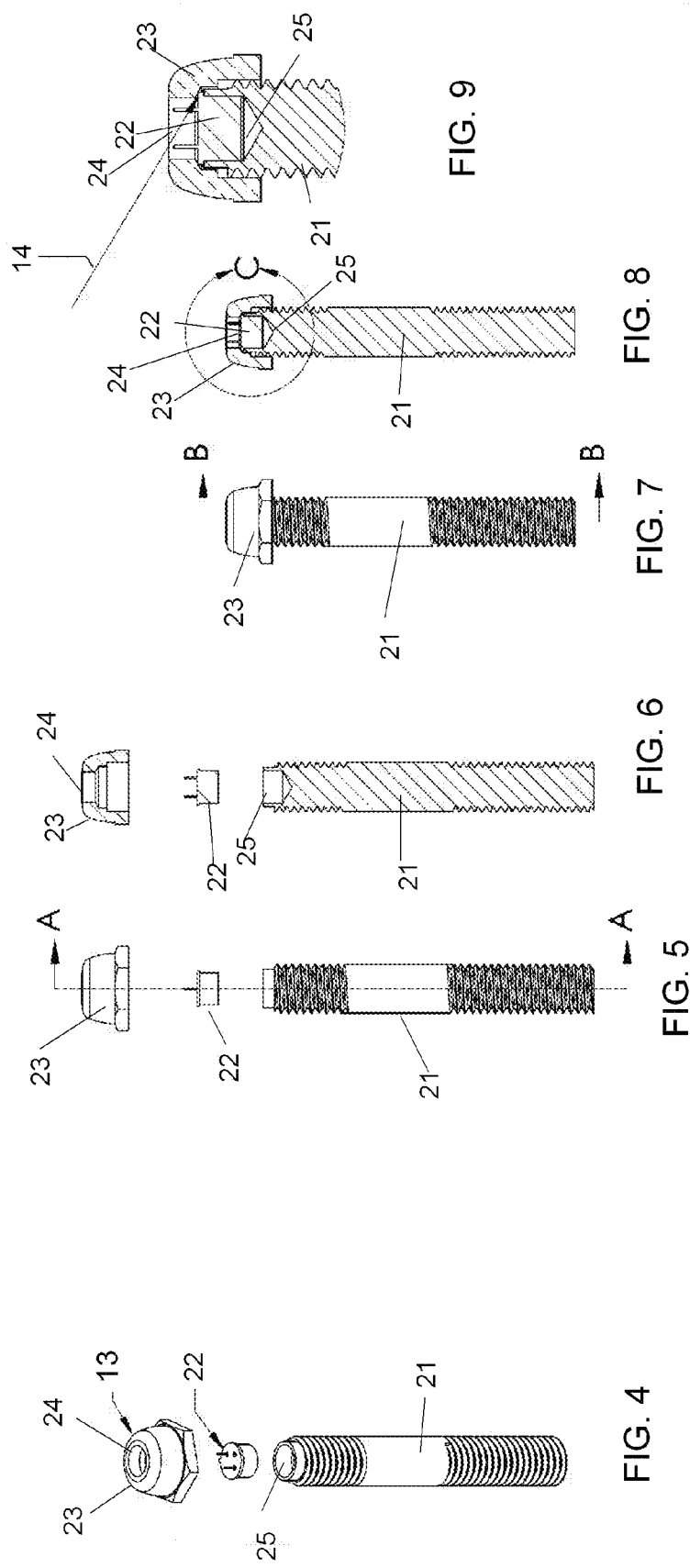

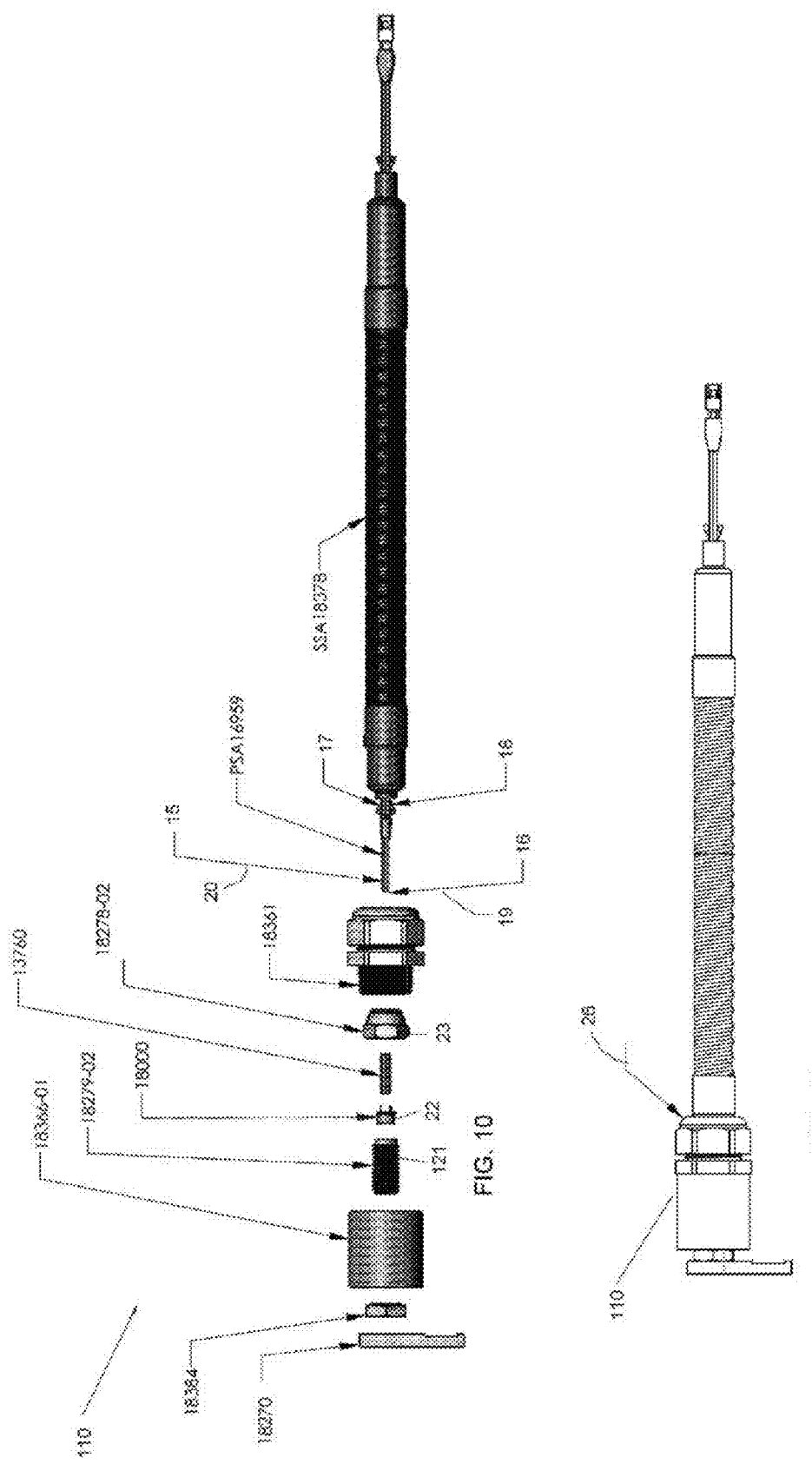

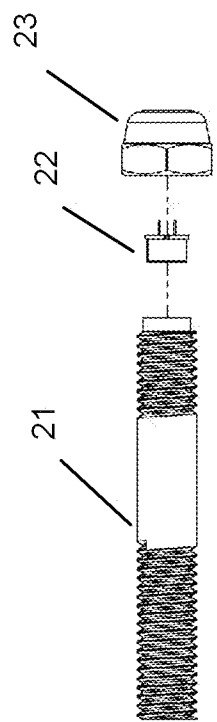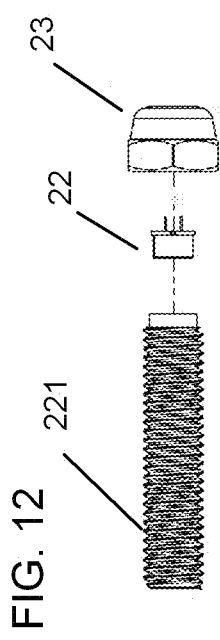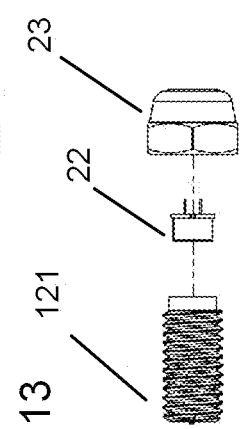

ACOUSTIC SENSOR HOLDER AND APPARATUS USING SAME

CROSS-REFERENCE TO RELATED APPLICATIONS

This is a non provisional patent application of U.S. Provisional Patent Application Ser. No. 61/393,682, filed 15 Oct. 2010.

Priority of U.S. Provisional Patent Application Ser. No. 61/393,682, filed 15 Oct. 2010, hereby incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to acoustic sensors. More particularly, the present invention relates to acoustic sensors employing novel holders.

2. General Background of the Invention

In a previous method of securing an acoustic sensor to a stud, a space is created in the post for the sensor to rest (as in the present invention described below). Four wires are soldered to the post, passed through a bread board, pulled tight, and terminated with solder at the bread board, thus sandwiching the sensor between the post and the bread board. The two signal leads of the sensor, which were also passed through the bread board, continue through to the PCB.

The following U.S. Patent documents are incorporated herein by reference.

U.S. Pat. No. 7,369,716 discloses a "High pressure and high temperature acoustic sensor."

U.S. Pat. No. 6,496,264 discloses a "Fiber optic acoustic sensor with specifically selected flexural disks."

U.S. Pat. No. 5,798,488 discloses an "acoustic sensor for use as part of a drill string in a borehole has an acoustic transducer which vibrates the drill bit in contact with the rock at the end of the borehole to generate acoustic signals in the rock. These acoustic signals propogate through the rocks ahead of the drill bit and are reflected and scattered to return to an acoustic sensor contained within the drill string."

U.S. Pat. No. 6,442,304 discloses an "Apparatus and method for protecting devices, especially fibre optic devices, in hostile environments".

U.S. Pat. No. 5,379,658 discloses an "Intrusive acoustic sensor mounting arrangement" with the use of a fluid tank.

U.S. Pat. No. 6,404,961 discloses an "Optical fiber cable having fiber in metal tube core with outer protective layer."

U.S. Pat. No. 6,536,553 discloses a "Method and apparatus using acoustic sensor for sub-surface object detection and visualization."

U.S. Patent Publication No. US 2010/0091613 discloses an "ACOUSTIC SENSOR UTILIZING ACOUSTOELECTRIC EFFECT."

U.S. Pat. No. 7,696,672 discloses an "Ultrasonic sensor having acoustic matching member with conductive layer formed on and extending only along acoustic matching member connecting surface".

U.S. Patent Publication No. US 2009/0309453 discloses an "Electro Acoustic Sensor for High Pressure Environments".

U.S. Patent Publication No. US 2009/0303838 discloses an "Acoustic Sensor and Method".

BRIEF SUMMARY OF THE INVENTION

The apparatus of the present invention includes a special threaded stud and a special acorn nut that together hold an acoustic sensor robustly in place by sandwiching the acoustic sensor between the stud and the acorn nut.

The apparatus of the present invention also includes an acoustic monitor field unit which includes a special threaded stud and a special acorn nut that together hold an acoustic sensor robustly in place by sandwiching the acoustic sensor between the stud and the acorn nut.

The apparatus of the present invention also includes a remote acoustic sensor assembly which includes a special threaded stud and a special acorn nut that together hold an acoustic sensor robustly in place by sandwiching the acoustic sensor between the stud and the acorn nut.

The special threaded stud can be a threaded rod with a pocket (machined or otherwise formed) in the end to receive the sensor. The special acorn nut can be for example a commercially available threaded acorn nut which is modified by drilling or otherwise forming a hole in the cap end large enough to allow clearance for the sensor signal wires (but not large enough to allow the acoustic sensor to pass therethrough). Alternatively, the acorn nut can be fabricated initially with the hole.

Preferably the pocket is not as deep as the sensor is high, so when the acorn nut is tightened it makes contact with the sensor.

Aside from the manner of securing the acoustic sensor, the acoustic monitor field unit or the remote acoustic sensor assembly can be the same as their prior art counterparts.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is an exploded view of a first preferred embodiment of the apparatus of the present invention;

FIG. 2 is a side view of the first preferred embodiment of the apparatus of the present invention;

FIG. 3 is a sectional view taken along lines A-A of FIG. 2 of the first preferred embodiment of the apparatus of the present invention;

FIG. 4 is an exploded view of the acoustic sensor assembly of the first preferred embodiment of the apparatus of the present invention;

FIG. 5 is an exploded view of the acoustic sensor assembly of the first preferred embodiment of the apparatus of the present invention;

FIG. 6 is an exploded view taken along lines A-A of FIG. 5 of the acoustic sensor assembly of the first preferred embodiment of the apparatus of the present invention;

FIG. 7 is an assembled view of the acoustic sensor assembly of the first preferred embodiment of the apparatus of the present invention;

FIG. 8 is an assembled view taken along lines B-B of FIG. 7 of the acoustic sensor assembly of the first preferred embodiment of the apparatus of the present invention;

FIG. 9 is a detailed view taken from section C of FIG. 8 of the acoustic sensor assembly of the first preferred embodiment of the apparatus of the present invention;

FIG. 10 is an exploded view of a second preferred embodiment of the apparatus of the present invention;

FIG. 11 is a side view of the embodiment of the apparatus of the present invention shown in FIG. 10; and FIGS. 12-14 show various embodiments of the present invention.

DETAILED DESCRIPTION OF THE INVENTION

The apparatus of the present invention includes a special threaded stud 21 and a special acorn nut 23 that together hold an acoustic sensor 22 robustly in place by sandwiching the acoustic sensor 22 between the stud 21 and the acorn nut 23.

The acorn nut mount design of the present invention is applicable to both remote cable attachment or stud mount local attachment.

A commercial embodiment of the present invention can be made as follows: A stainless steel 1/2-13 (or 1/2-20) set screw or a 1/2-13 (or 1/2-20) stainless steel threaded stud 21 is modified with a drilled hole 25 large enough and deep enough to receive the acoustic sensor 22 body in one end. Acorn nut 23 is made by taking a commercially available 1/2-13 (or 1/2-20) threaded acorn nut and modifying it by drilling a hole 24 in the cap end large enough to allow clearance for the sensor signal wires (but not large enough to allow the acoustic sensor to pass therethrough). When the acoustic sensor 22 is placed in the set screw or stud cavity 25 with the sensor signal wires pointing outwards the modified acorn nut 23 is passed over the signal wires and threaded on and tightened securely. This captures the sensor 22 mounting flange and creates a solid mechanical contact between the set screw or stud 21 and the sensor flange (see FIG. 9). Vibrations from the set screw or stud 21 mounting to the equipment being monitored are transmitted through the set screw or stud 21 to the acoustic sensor 22 body. Stud 21, sensor 22, and nut 23 are shown in use in FIGS. 1, 2, and 3 in an acoustic field unit assembly 10.

The present invention also includes a system for securing acoustic sensor 22 to an acoustically conductive mounting apparatus, such as remote acoustic sensor assembly 110 shown in FIGS. 10 and 11. A screw or threaded stud 121 is modified with a drilled hole (not shown in the drawings, but similar to hole 25) to receive the sensor body 22. A nut 23 is tightened to the rod 121 that both captivates the sensor 22 and allows wire pass through. Acoustic signals entering the mounting apparatus are transmitted through to the sensor 22 body.

The threaded studs 21, 121, of the present invention are preferably made of stainless steel, though they could be made of steel or aluminum. The acorn nuts 23 of the present invention are preferably made of brass, though they could be made of steel or aluminum.

As can be seen for example in FIGS. 4, 6, 8, and 9, hole 25 in stud 21 is a closed cavity having a conical bottom.

Hole 25 is shown as having a conical bottom (see FIG. 9). However, it could have a flat bottom, round bottom or other shaped bottom.

Exemplary dimensions of the various parts of the present invention are as follows:
length of stud 21: 2.29"-2.31" (typical range 0.25-24")
diameter of stud 21: 0.50" (typical range 0.125-2")
height of sensor 22: 0.212"-0.214" (typical range 0.1-1")
diameter of sensor 22: 0.315"-0.331" (typical range 0.1-1")
nut 23 hex size: 0.75" (typical range 0.125-2")
height of nut 23: 0.56" (typical range 0.1-2")
diameter of hole 24 in nut 23: 0.308"-0.318" (typical range 0.1-1")
diameter of hole 25 in stud 21: 0.323"-0.333" (typical range 0.1-1")
depth of hole 25 in stud 21: 0.19"-0.21" (typical range 0.01-1")
length of stud 121: 0.673" (typical range same as stud 21)
diameter of stud 121: same as stud 21
diameter of hole in stud 121: same as stud 21
depth of hole in stud 121: same as stud 21
length of stud 221: 1.48" (typical range same as stud 21)
diameter of stud 221: same as stud 21
diameter of hole in stud 221: same as stud 21
depth of hole in stud 221: same as stud 21

FIG. 3 shows an amount of rod protruding from gland, identified by arrows 11. Heat shrink is flush with the end of the short section of threads on the rod, as indicated by arrow 12.

FIG. 4 shows nut 23 with a pass through (identified by arrow 13) and threaded rod 21 with a machined pocket in the end for the sensor 22.

FIG. 9 shows sensor 22 seated in the pocket in rod 21 and retained by nut 23 (identified by arrow 14). The pass through in nut 23 allows access to the sensor leads.

Use 16770 Loctite with the parts seen in FIG. 10 and identified by arrows 18270, 18278-01. FIG. 10 shows two halves of one piece (indicated by arrow 13760). Black wire 15, red wire 16, blue wire 17 and orange wire 18 are also seen in FIG. 10. The red wire 16 is soldered to the black terminal on sensor 22 (as indicated by arrow 19). The black wire 15 is soldered to silver terminal on sensor 22 (as indicated by arrow 20). Lengths of the black wire and red wire is seen in PSA 16959 (FIG. 10).

FIG. 11 shows the gland up against the edge of the outer black insulation and tightened onto the portion of cable where the heatshrink is over the aluminum armor (identified by arrow 26).

Assembly Instructions:
1. INSTALL 17067,18274,18203, AND 18237 TO THE 18181 BRACKET AS SHOWN.
2. ASSEMBLE THE CIRCUIT BOARDS AND SWITCH ASSY TO THE 18181 BRACKET AS SHOWN. INSTALL THE 18181 BRACKET TO THE INSIDE OF THE ENCLOSURE AS SHOWN.
3. SLIDE THE 18282 HEATSHRINK ONTO THE END OF THE 18250-01 ROD WITH THE SHORTER SECTION OF THREADS UNTIL IT IS JUST PAST THE THREADS. APPLY HEAT.
4. INSTALL THE 18250-01 ROD INTO THE 17439 GLAND AS SHOWN. 0.41" OF THE SENSOR END OF THE 18250-01 ROD MUST PROTRUDE FROM THE GLAND. TIGHTEN THE GLAND CLAMPING NUT.

5. INSTALL THE 17439 GLAND INTO THE FIBOX ENCLOSURE AS SHOWN AND TIGHTEN THE GLAND LOCKNUT.
6. COMPLETELY THREAD THE 17887 NUT ONTO THE END OF THE 18250 ROD WITH THE LONGER SECTION OF THREADS. TIGHTEN WITH RED LOCTITE.
7. INSERT THE SENSOR OF SSA 18259 INTO THE 18250 ROD CAVITY. TIGHTEN THE 18278-01 ACORN NUT.
8. INSTALL THE BATTERY WITH THE 18242 ZIP TIE TO THE 18203 BATTERY MOUNT.
9. INSTALL THE LID.

Aside from the manner of securing the acoustic sensor 22, the acoustic monitor field unit 10 or the remote acoustic sensor assembly 110 can be the same as their prior art counterparts. Thus, more details of their construction are omitted as they will be apparent to those of ordinary skill in this art.

PARTS LIST

The following is a list of parts suitable for use in the present invention:

| Parts Number | Description |
| --- | --- |
| 10 | acoustic monitor field unit assembly of a preferred embodiment of the present invention |
| 11 | arrow |
| 12 | arrow |
| 13 | arrow |
| 14 | arrow |
| 15 | black wire |
| 16 | red wire |
| 17 | blue wire |
| 18 | orange wire |
| 19 | arrow |
| 20 | arrow |
| 21 | threaded stud with cavity 25 therein |
| 22 | acoustic sensor (such as Model 400ER080 commercially available from ProWave Electronic Corporation) |
| 23 | acorn nut with hole 24 therein |
| 24 | hole in acorn nut 23 |
| 25 | cavity in threaded stud 21 |
| 26 | arrow |
| 110 | remote acoustic sensor assembly of a preferred embodiment of the present invention |
| 121 | threaded stud with cavity therein for receiving acoustic sensor 22 |
| 221 | threaded stud with cavity therein for receiving acoustic sensor 22 |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. An acoustic apparatus including:
   a threaded stud having an end and a hole in the end;
   an acorn nut having a hole therein;
   an acoustic sensor received in the hole of the stud and secured to the stud and acorn nut when the acorn nut is screwed onto the stud, thereby sandwiching the acoustic sensor between the stud and the acorn nut,
   wherein the hole in the stud is a closed cavity having a conical bottom.

2. An acoustic monitor field unit comprising the apparatus of claim 1.

3. A remote acoustic sensor assembly comprising the apparatus of claim 1.

4. An acoustic sensor assembly comprising the apparatus of claim 1.

5. The acoustic sensor assembly of claim 4, wherein the hole in the acorn nut is large enough to allow clearance for sensor signal wires, but not large enough to allow the acoustic sensor to pass therethrough.

6. The remote acoustic sensor assembly of claim 3, wherein the hole in the acorn nut is large enough to allow clearance for sensor signal wires, but not large enough to allow the acoustic sensor to pass therethrough.

7. The acoustic monitor field unit of claim 2, wherein the hole in the acorn nut is large enough to allow clearance for sensor signal wires, but not large enough to allow the acoustic sensor to pass therethrough.

8. The acoustic apparatus of claim 1, wherein the hole in the acorn nut is large enough to allow clearance for sensor signal wires, but not large enough to allow the acoustic sensor to pass therethrough.

9. The acoustic apparatus of claim 8, wherein the hole in the stud is not as deep as the acoustic sensor is high, so when the acorn nut is tightened the acorn nut makes contact with the sensor.

10. The acoustic apparatus of claim 1, wherein the hole in the stud is not as deep as the acoustic sensor is high, so when the acorn nut is tightened the acorn nut makes contact with the sensor.

11. The acoustic monitor field unit of claim 2, wherein the hole in the stud is not as deep as the acoustic sensor is high, so when the acorn nut is tightened the acorn nut makes contact with the sensor.

12. The remote acoustic sensor assembly of claim 3, wherein the hole in the stud is not as deep as the acoustic sensor is high, so when the acorn nut is tightened the acorn nut makes contact with the sensor.

13. The acoustic sensor assembly of claim 4, wherein the hole in the stud is not as deep as the acoustic sensor is high, so when the acorn nut is tightened the acorn nut makes contact with the sensor.

14. The acoustic sensor assembly of claim 5, wherein the hole in the stud is not as deep as the acoustic sensor is high, so when the acorn nut is tightened the acorn nut makes contact with the sensor.

15. The remote acoustic sensor assembly of claim 6, wherein the hole in the stud is not as deep as the acoustic sensor is high, so when the acorn nut is tightened the acorn nut makes contact with the sensor.

16. The acoustic monitor field unit of claim 7, wherein the hole in the stud is not as deep as the acoustic sensor is high, so when the acorn nut is tightened the acorn nut makes contact with the sensor.

\* \* \* \* \*